(12) United States Patent
Garrett et al.

(10) Patent No.: US 11,483,077 B2
(45) Date of Patent: Oct. 25, 2022

(54) OPTICAL SWITCHING AND ELECTRICAL POWERING ARCHITECTURE FOR UNDERSEA MESH NETWORKING

(71) Applicant: SUBCOM, LLC, Eatontown, NJ (US)

(72) Inventors: Lara Denise Garrett, Red Bank, NJ (US); Haifeng Li, Morganville, NJ (US); Stanley C. Wisniewski, II, Cream Ridge, NJ (US); Thomas Marino, Jr., Eatontown, NJ (US)

(73) Assignee: SUBCOM, LLC, Eatontown, NJ (US)

( * ) Notice: Subject to any disclaimer, the term of this patent is extended or adjusted under 35 U.S.C. 154(b) by 0 days.

(21) Appl. No.: 17/322,452

(22) Filed: May 17, 2021

(65) Prior Publication Data

US 2021/0391925 A1 Dec. 16, 2021

Related U.S. Application Data

(60) Provisional application No. 63/038,434, filed on Jun. 12, 2020.

(51) Int. Cl.
*H04B 10/00* (2013.01)
*H04B 10/80* (2013.01)
*H04Q 11/00* (2006.01)

(52) U.S. Cl.
CPC ......... *H04B 10/801* (2013.01); *H04B 10/806* (2013.01); *H04Q 11/0003* (2013.01); *H04Q 11/0005* (2013.01); *H04Q 2011/006* (2013.01)

(58) Field of Classification Search
CPC .. H04B 10/806; H04B 10/807; H04B 10/808; H04B 10/032; H04B 10/035; H04B 10/0066; H04B 10/0067; H04B 10/29; H04B 10/291; H04B 10/07955; H04Q 11/0003; H04Q 11/0005
USPC ....... 398/104, 105, 173, 175, 176, 177, 178, 398/179, 160, 180, 181, 33, 38, 158, 159, 398/45, 48, 49
See application file for complete search history.

(56) References Cited

U.S. PATENT DOCUMENTS 7,120,362 B2   10/2006   Pedersen et al.
10,461,852 B1 *  10/2019   Grubb .............. H04B 10/07955
(Continued)

OTHER PUBLICATIONS

European Search Report dated Nov. 16, 2021, for the EP Patent Application No. 21174361.2, filed on May 18, 2021, 9 pages.

*Primary Examiner* — Hanh Phan
(74) *Attorney, Agent, or Firm* — KDB Firm PLLC

(57) ABSTRACT

Disclosed is an undersea power routing device including a first coupling port, a high voltage converter a second coupling port. The first coupling port may be configured to be coupled to an electrical power conductor and fiber optical cables of an undersea branch cable. The high voltage converter may be coupled to the first coupling port and operable to connect to the electrical power conductor via the first coupling port. The high voltage converter may be further operable to convert a high voltage electrical power supplied by the electrical power conductor to an output voltage having a lower voltage electrical power than the high voltage electrical power. The second coupling port may be configured to couple the high voltage converter to an interconnect cable. The high voltage converter, when coupled to the interconnect cable, may be operable to distribute the lower voltage electrical power to the interconnect cable.

19 Claims, 8 Drawing Sheets

(56) References Cited

U.S. PATENT DOCUMENTS

2017/0184799 A1 6/2017 Huegerich et al.
2018/0269990 A1* 9/2018 Muth ................... H04B 10/807

* cited by examiner

OPTICAL SWITCHING AND ELECTRICAL POWERING ARCHITECTURE FOR UNDERSEA MESH NETWORKING

TECHNICAL FIELD

Examples of the present disclosure relate to the field of optical communication systems. More particularly, the present disclosure relates to an improved optical switching and electrical powering architecture for undersea mesh networking used in optical communication systems.

BACKGROUND

Long-haul optical communication systems, such as submarine optical communication systems, may include numerous interconnected optical cables to facilitate the communication of data and information. The optical cables may be trunk optical cables and may include bi-directional trunk fiber pairs, that enable bi-directional communication.

In undersea optical communication systems, interconnect cables via branching units may be used to connect a first trunk optical cable to a second trunk optical cable. To function, the interconnect cables must be powered. When a network is powered only between power feed equipment's (PFEs) in stations and undersea grounds, it may not be possible to power all segments of the network when a shunt fault occurs in any one segment.

SUMMARY

Disclosed is an undersea power routing device including a first coupling port, a high voltage converter a second coupling port. The first coupling port may be configured to be coupled to an electrical power conductor and fiber optical cables of an undersea branch cable. The high voltage converter may be coupled to the first coupling port and operable to connect to the electrical power conductor via the first coupling port. The high voltage converter may be further operable to convert a high voltage electrical power supplied by the electrical power conductor to an output voltage having a lower voltage electrical power than the high voltage electrical power. The second coupling port may be configured to couple the high voltage converter to an interconnect cable. The high voltage converter, when coupled to the interconnect cable, may be operable to distribute the lower voltage electrical power to the interconnect cable.

Provided is an undersea cable branching architecture that includes a switching branching unit, a branch cable, and a power termination unit. The switching branching unit may be coupled to at least one trunk undersea fiber optic cable. The branch cable may be coupled to the switching branching unit. The branch cable may include at least two fiber pairs and at least one electrical power conductor. The switching branching unit may be operable to switch a high voltage electrical power supplied by the at least one trunk undersea fiber optic cable to the at least one branch cable. The power termination unit may have a first port coupled to the at least one electrical power conductor of the branch cable and a second port. The power termination unit may be operable to obtain the high voltage electrical power from the at least one electrical power conductor of the branch cable. The power termination unit may convert the high voltage electrical power from the switching branching unit to electrical power with a lower voltage than the high voltage electrical power and supply the electrical power with the lower voltage to the second port.

DETAILED DESCRIPTION

Figure 1:
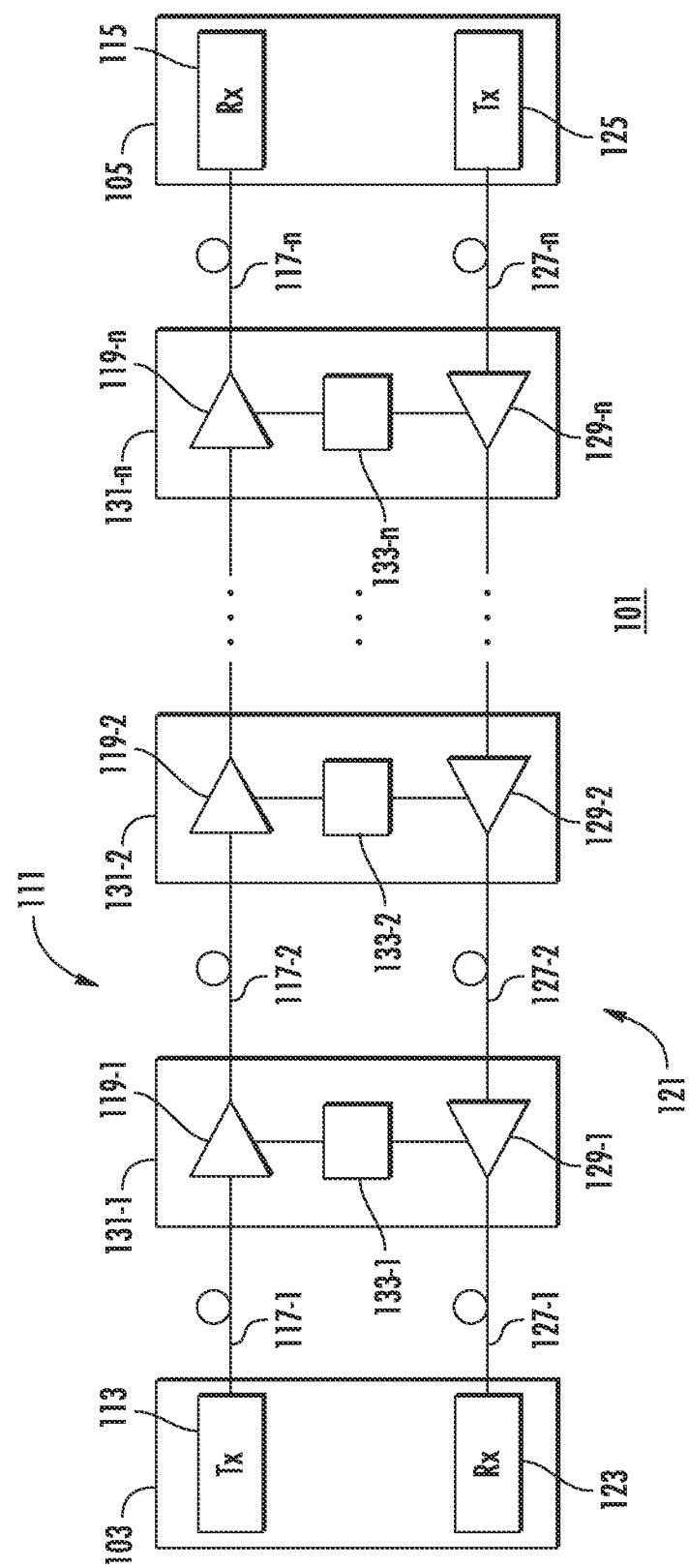
FIG. 1 illustrates an example optical communication system.

The disclosed subject matter is directed to at least an improved optical switching and electrical powering architecture for undersea mesh networking used in optical communication systems. According to the examples, undersea optical switching and power conversion (e.g., via one or more DC/DC converters) techniques provide flexible fiber pair allocation and electrical power between two interconnected undersea systems. The disclosed subject matter enables independent powered off of any trunk optical cable and the shunt fault protection for interconnect cables. Additionally, the disclosed switched branching unit provides any-to-any optical switching for two fiber pairs providing increased pair connectivity options.

In an example, trunk cables and interconnect cables may include optical fibers and power conductors. As described below, a switching branching Unit (sBU) may be configured to connect a respective trunk optical cable to an interconnect cable and each sBU may be configured to route electrical power from one trunk optical cable to the interconnect cable. Moreover, a Power Termination Unit (PTU) may be configured to convert a high voltage, low current power supply from the sBU to a lower voltage, higher current supply that is appropriate for powering undersea repeaters and other equipment powered through the interconnect cable. Thus, in the examples, the PTU may provide DC/DC conversion functionality.

In the examples, each end of an interconnect cable may terminate at a respective PTU. The two PTUs together provide flexible power distribution to the interconnect cable, such as the adjustment of their respective voltage outputs to compensate for a shunt fault that may occur anywhere along the trunk optical cable. In further examples, each sBU may include optical switching functionality to determine the connectivity between fiber pairs in the trunk and interconnect cables (e.g., this may be referred to as two fiber pair "any-to-any" (A2A) or "two fiber pair any-to-any (2 FP A2A) connectivity).

According to examples, as will be described below, at least four different undersea mesh network configuration states are set forth for the system architecture, where the configurations states are implemented by changing the states of the at least four 2FP A2A sBU functionalities. It may be understood that many more different configuration combinations or variations are supported herein. Furthermore, while only two fiber pairs are shown and described, the available number of fiber pairs in the trunk optical cables can be divided into sets of two so as to implement the described functionalities.

In yet further examples, the undersea interconnect cable between the sBU and PTU may include a dual-conductor cable to carry electrical power from a first branching unit (e.g., sBU) to the PTU, and then back to a second branching unit to continue on the trunk optical cable. Further, interconnect branches can be terminated only on one end with a PTU, with ground at the other end. In other instances, interconnect branches that do not contain powered equipment may not need the PTU but may still benefit from the flexible optical switching. Interconnect cables can be provided in simple "H" architectures as shown in one or more of the illustrated examples. In addition, more complex "branch off of branch" configurations can also be supported. In examples, the powering feature may be optional in repeaterless interconnect cables.

The disclosure describes and illustrates examples of a two (2) fiber pair selection group. Switching function examples are also provided to illustrate the linking of more than two fiber pairs together into a configuration group. For instance, an interconnect cable may be organized into groups of two fiber pairs (2FPs), and each set of 2FPs may be terminated at each end of the interconnect cable at an instance of the 2FP A2A selector function, allowing the interconnect fiber pairs to connect to an east or west trunk, or allowing the trunk to bypass the interconnect cable altogether. Moreover, it may also be understood that the disclosure and the related examples and features may be supported by a single fiber pair trunk selector, as described below.

Additional fiber pairs can be provided between the stations and the sBUs, so that recovery paths can be provided for disrupted "oceanic" FPs in one trunk, without disrupting the fiber pairs in another trunk.

Accordingly, interconnect powering can be maintained even during shunt faults in the trunk, and further, shunt fault protection can be provided in the interconnect cable, independent of the shunt fault status of the trunk optical cable. In addition, based on system design or other architecture-based considerations, reconfigurable routing of trunk fiber pairs through these interconnect cables may be provided in response to the occurrence of a shunt fault.

The examples, features, figures, etc. described and presented herein provide numerous advantages over conventional techniques, for example, the disclosed examples provide the advantages of at least (i) supporting a single end feed operation and/or (ii) allowing freedom to connect interconnect fiber pairs to either trunk traffic direction based on undersea optical switching which provides novel powering and switching functionality in a new network architecture. Moreover, multiple interconnect cables can be independently powered off of any trunk optical cable using a PTU. The provisioning of shunt fault protection for interconnect cables is advantageously also provided. The use of the 2FP A2A (and single fiber-pair-based trunk selector) optical switching function in a mesh network architecture or configuration is not only novel (providing a greater number of potential fiber pair connectivity options than other solutions), but also provides more robust interconnect cable powering as described herein. Furthermore, the disclosed examples provide more flexible connectivity between trunk and interconnect fiber pairs, and further provide additional network configurations to allocate traffic capacity and enable reconfiguration of the network to meet traffic needs during failure events, during repairs, and the like.

The following describes the disclosed examples more fully with reference to the accompanying drawings. The disclosed examples, however, may be embodied in many different forms and should not be construed as limited to the examples set forth herein. Rather, these examples are provided so that this disclosure will be thorough and complete, and will fully convey the scope of the disclosed subject matter to those skilled in the art. In the drawings, like numbers refer to like elements throughout.

Referring to the drawings, FIG. 1 illustrates an exemplary bi-directional optical communication system 101 which may use a number of high-bandwidth fiber optic cables to transmit vast amounts of data over long distances. The fiber optic cables may include a large number of optical fibers. Bi-directional data transmission may be implemented by constructing pairs of optical fibers within the fiber optic cable and transmitting one or more channels, e.g., wavelength division multiplexed channels, per fiber pair.

As shown, the optical communication system 101 may include terminals 103 and 105 connected by two unidirectional optical paths 111, 121, which together form a bi-directional optical fiber pair. Optical path 111 may transmit information in one direction (e.g., to the right) from a transmitter Tx 113 at terminal 103 to a receiver Rx 115 at terminal 305. Optical path 121 may transmit information in the other direction (e.g., to the left) from a transmitter Tx 125 at terminal 105 to a receiver Rx 123 at terminal 103. With respect to terminal 103, the optical path 111 is an outbound path and the optical path 121 is an inbound path to receiver Rx 123 of terminal 103. The optical path 111 may include optical fibers 117-1 to 117-$n$ and optical amplifiers 119-1 to 119-$n$ that are coupled to repeaters 131-1 to 131-$n$. The optical path 121 may include optical fibers 127-1 to 127-$n$ optical amplifiers 129-1 to 129-$n$ that are also coupled to repeaters 131-1 to 131-$n$. The one or more of the optical amplifiers 119-1 to 119-$n$ and 129-1 to 129-$n$ may be erbium-doped fiber amplifiers (EDFAs), other rare earth doped fiber amplifiers, Raman amplifiers, semiconductor optical amplifiers (SOAs), or the like. It may be understood that, in some examples, the transmitter TX 113 and the receiver RX 123 may be housed together as a transponder at terminal 103, and similarly, the transmitter TX 115 and the receiver RX 125 may also be housed together as a transponder at terminal 105.

The optical path pair (e.g., optical paths 111, 121) may be configured as a set of amplifier pairs 119-1 to 119-$n$ and 129-1 to 129-$n$ within repeaters 131-1 to 131-$n$ connected by pairs of optical fibers 117-1 to 117-$n$ and 127-1 to 127-$n$, which may be included in an optical fiber cable together with fibers supporting additional path pairs. Each repeater 131-1 to 131-$n$ may include a pair of amplifiers 119-1 to 119-$n$, 129-1 to 129-$n$ for each respective path pair and may include additional amplifiers for additional path pairs. A coupling path 133-1 to 133-$n$ may be coupled between optical paths 111, 121, for example, in one or more of the respective repeaters 131-1 to 131-$n$. It may be understood that the term "couple" or "coupled," as used herein, broadly refers to any connection, connecting, coupling, link, or linking, either directly or indirectly, or as a wired or a wireless connection, and, unless otherwise stated, does not necessarily imply that the coupled components or elements are directly connected to each other.

Although an exemplary example of the optical communication system 101 is shown and described, variations of the optical communication system 101 are within the scope of the present disclosure. The optical communication system 101 may include, for example, more optical path pairs and more or fewer repeaters, which utilize electrical power provided by power feed equipment that is distributed through cabling along the respective optical paths 111 and 121. Alternatively, the optical communication system 101 may not include any optical amplifiers or may include, instead of optical amplifiers, optical pump power sources suitable for implementing optical gain, for example, by Raman amplification within optical fibers connecting repeaters.

Moreover, it may be understood that the transmitters, receivers, transponders containing the transmitters and receivers, or any other suitable device for transmitting and receiving data, may be included in a respective sBU, which may be coupled to or include devices having at least one memory and one or more processors (e.g., CPU, ASIC, FGPA, any conventional processor, etc.) to execute instructions stored in memory.

It may further be understood that the above-described optical paths (i.e., 111, 121) may be powered via power conductor(s) of the optical cables, such as those shown in the following example. Moreover, multiple optical communication systems, such as optical communication system 101, may be interconnected via interconnect cables and branching units.

Figure 2:
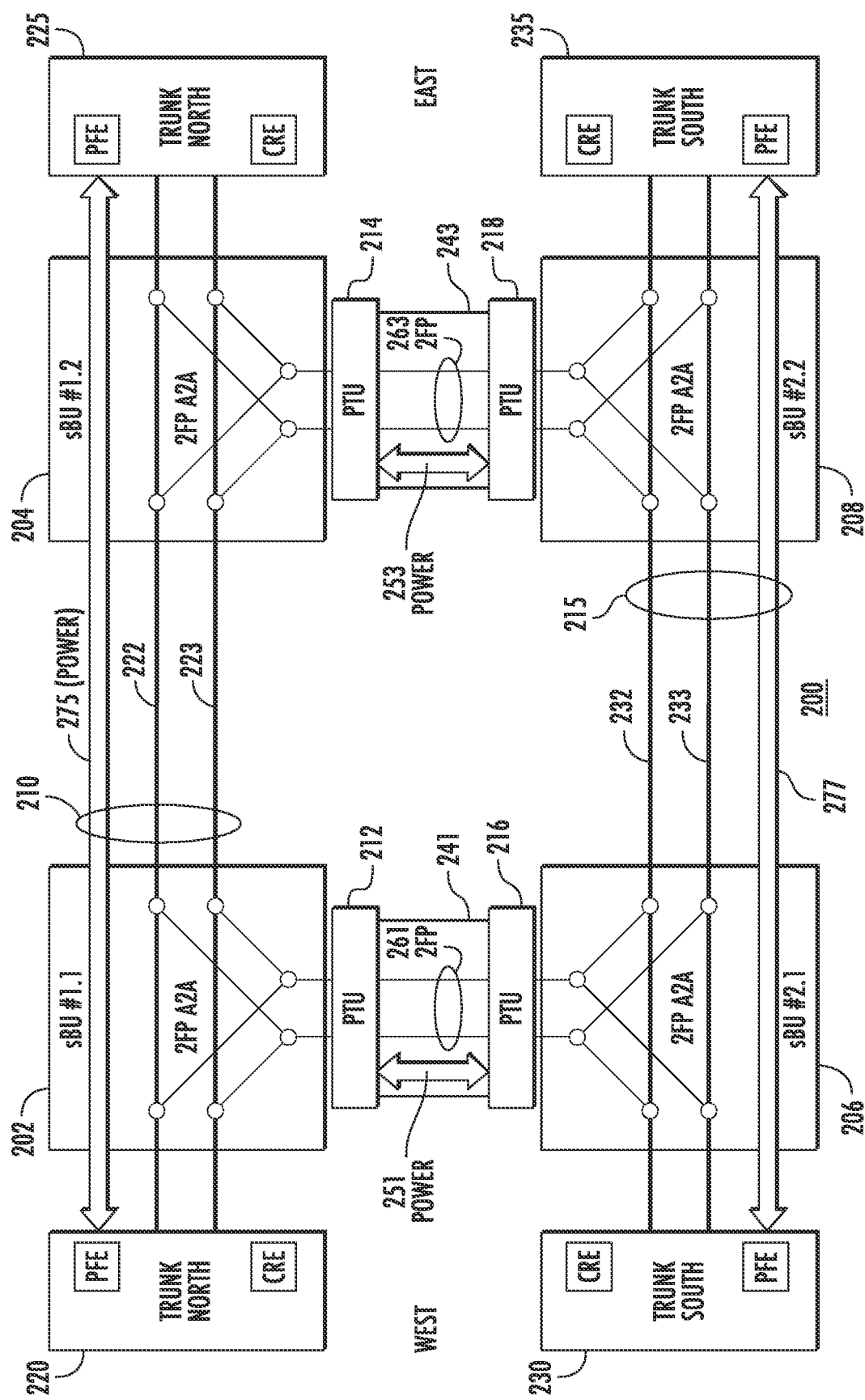
FIG. 2 illustrates an example undersea mesh network.

FIG. 2 illustrates an example mesh network according to one or more examples. As shown, the mesh network 200 may include at least two trunk-North bi-directional fiber pairs 222 and 223 of a respective trunk-North optical cable 210 arranged between a trunk-North terminal 220 on a west side and a trunk-North terminal 225 on an east side. As further shown, similarly, the mesh network 200 may include at least two trunk-South bi-directional fiber pairs 232 and 233 of respective trunk-South optical cables arranged between a trunk-South terminal 230 on the west side and a trunk-South terminal on the east side 235. Each of the four illustrated terminals may include power feed equipment (PFE) to provide at least electrical power to the conductor cables (shown as 275 and 277, respectively) in the fiber pairs. In this example, the power feed equipment (PFE) provides trunk power to the respective trunks 220, 225, 230 and 235.

The mesh network 200 may include four separate "switched" branching units (sBUs) 202 (also referred to as sBU #1.1), 204 (also referred to as sBU #1.2), 206 (also referred to as sBU #2.1), and 208 (also referred to as sBU #2.2), two of which are arranged on or coupled to the trunk-North cable 210 and the other two arranged on or coupled to the trunk-South cable 215. As illustrated, sBUs 202 and #2.1 interconnect the trunk north and south cables on (or nearer to) the West side vi, and similarly, sBUs #1.2. and 208 interconnect the cables on (or nearer to) the East side via interconnect cable 243. In an example, each of the sBUs #1.1, #1.2, #2.1, and 208 are configured to perform fiber switching and routing of power to a respective power termination unit (PTU). For instance, on the North side, sBU 202 routes power to PTU 212 and sBU #1.2. routes power to PTU 214, while on the South side, sBU #2.1 routes power to PTU 216 and sBU #2.2 routes power to PTU 218. Each of the respective sBUs may be operable to connect at least one of at least two fiber pairs (e.g., 222 and 223) of the trunk fiber optic cable 210 to a respective one fiber pair of the at least two fiber pairs of the branch cable (which couples to a PTU, such as 212).

According to examples, the PTUs 212, 214, 216, and 218 may be configured to provide power to the interconnect cable 241 or an interconnect cable 243, respectively, and further provides shunt fault protection by enabling the re-routing of electrical power (as well as optical fiber re-routing) to mitigate the effects of an shunt fault. A PTU, such as 212, 214, 216 and 218, may include 1 or more ports to obtain electrical power from an sBU, such as 1.1 or 2.1, as well as ports to provide electrical power to an interconnect cable such as interconnect cable 241 or 243. In addition, the PTU may include a high voltage direct current to direct current (DC/DC) converter (shown in a later example). The DC/DC converter may, for example, be operable to provide constant current or constant voltage as well as limit current and voltages to thresholds set by control equipment. For example, each trunk 220, 225, 230 and 235 may include command/response equipment (CRE) that is operable via telemetry to control the optical switching of each of the respective sBUs #1.1, #1.2, #2.1, and #2.2 and the electrical power switching to the respective PTUs 212, 214, 216 and 218. The CRE may also control the electrical power conversion of each the respective PTUs 212, 214, 216 and 218 via control commands through the fiber optic cables coupled to the respective PTU or via telemetry.

As illustrated in FIG. 2, for example, the interconnect power between sBUs 202, #2.1 and sBUs #1.2, 208 may be provided by a dual-conductor interconnect cable(s) (also referred to as a DCC) that are included with the interconnect cable 241 or the interconnect cable 243. For example, the interconnect cable 241 may include at least power conductor 251 and at least two fiber pairs (2FP) 261. Similarly, the interconnect cable 243 may include at least power conductor 253 and at least two fiber pairs (2FP) 263. As described below, the two-fiber pair, any-to-any (also referred herein as "2FP A2A") selector function of each of the sBUs 202 provides a flexible network configuration, such as flexible optical switching and electrical powering, enabling responses, such as re-routing to undersea environmental circumstances (e.g., shunt faults, etc.).

To at least that end, the mesh network 200 illustrated in FIG. 2 may be considered an "all-trunk" configuration, which means, for instance, that all the trunk fiber pairs, for both North and South, are connected, powered, and operational between their respective trunk terminals.

Figure 3:
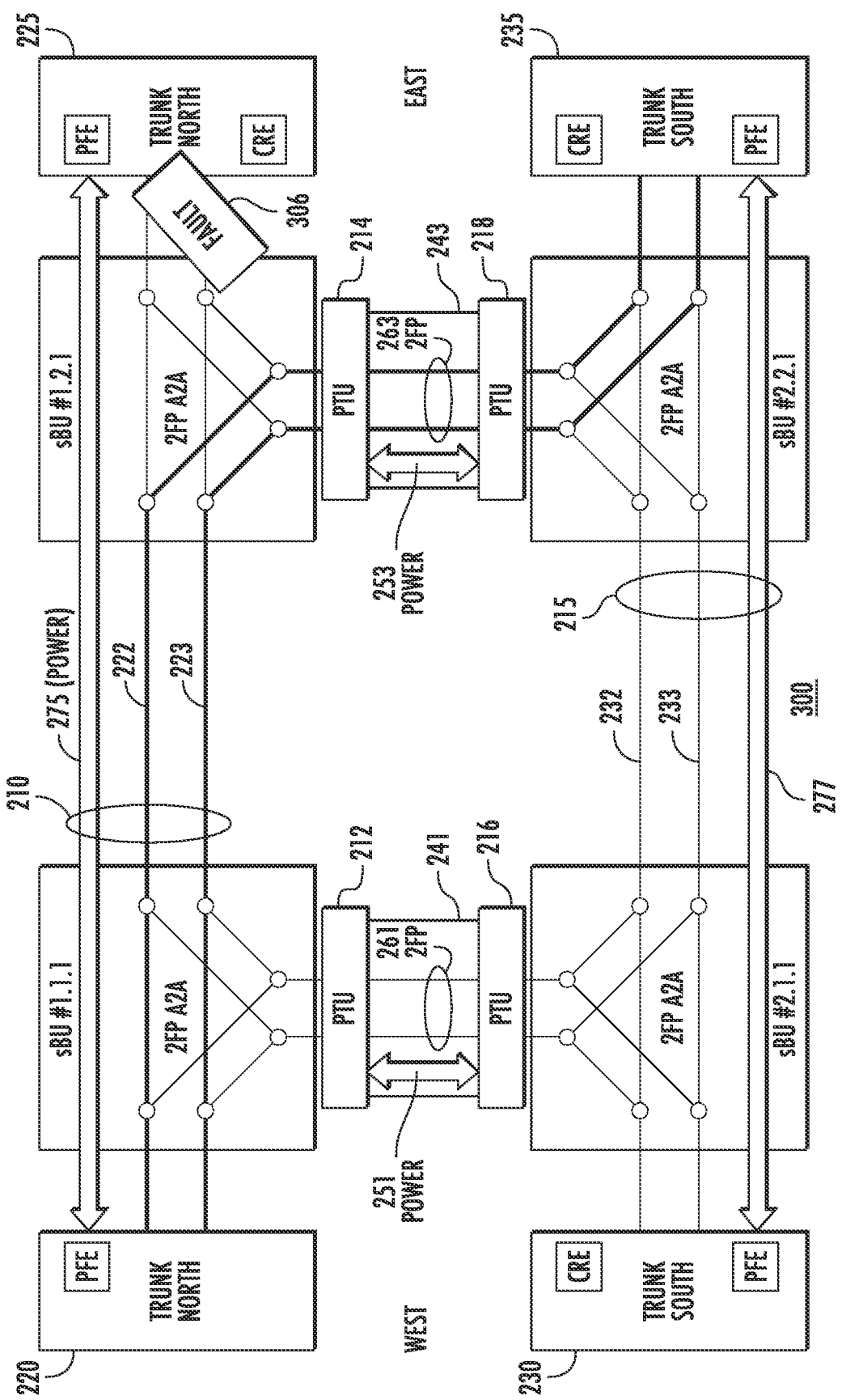
FIG. 3 illustrates a first example of a fault and a switching configuration.

FIG. 3 illustrates an example of shunt fault and switching configuration 300 according to one or more aspects of the disclosed subject matter. For ease of explanation, the mesh network 200 of FIG. 2 and the components therein are used to describe the shunt fault and switching configuration 300 of FIG. 3. The configuration 300 may be implemented as a mesh network. As shown, a shunt fault 306 may occur near the East side of the trunk-North fiber pairs (i.e., between sBU #1.2.1 and trunk-North terminal 225). It may be understood that a shunt fault may broadly refer to any type of fault (physical or otherwise) occurring in submarine communication cables, for example, when cable insulation becomes damaged such that there is a short circuit from the metallic conductor core to the seawater directly, or the like. In addition, or alternatively, cable damage may be caused, in some examples, by ship anchors, fishing trawlers, backhoe dredgers, currents dragging the cable along the sea floor, etc. For example, a shunt fault may be detected by determining, for example, by power feed equipment, or the like, that there has been a loss of electrical power or a decrease by a predetermined amount of voltage or current within the respective trunks 210 or 215.

When the shunt fault occurs, for example, at least power to the interconnects (e.g., interconnect cables between sBUs #1.1.1, #2.1.1 and/or sBUs #1.2.1, #2.2.1) between the North and South trunk fiber pairs may be cut off. Thus, in examples, when the occurrence of shunt fault is detected (or based on any determination that a shunt fault will occur or for any other reason), optical switching on one or more of the sBUs #1.1.1 to #2.2.1 can be performed to at least re-route power based on the location of the shunt fault. As illustrated, both of the trunk-North fiber pairs 222 and 223 may be re-routed or switched to the trunk-South fiber pairs 233, 232, respectively, by reconfiguring the connection of the ports of sBUs #1.2.1 and #2.2.1. Advantageously, power can still be provided to the interconnect cable 243 between trunk-North 220 and trunk-South 235 despite the occurrence of the shunt fault.

Figure 4:
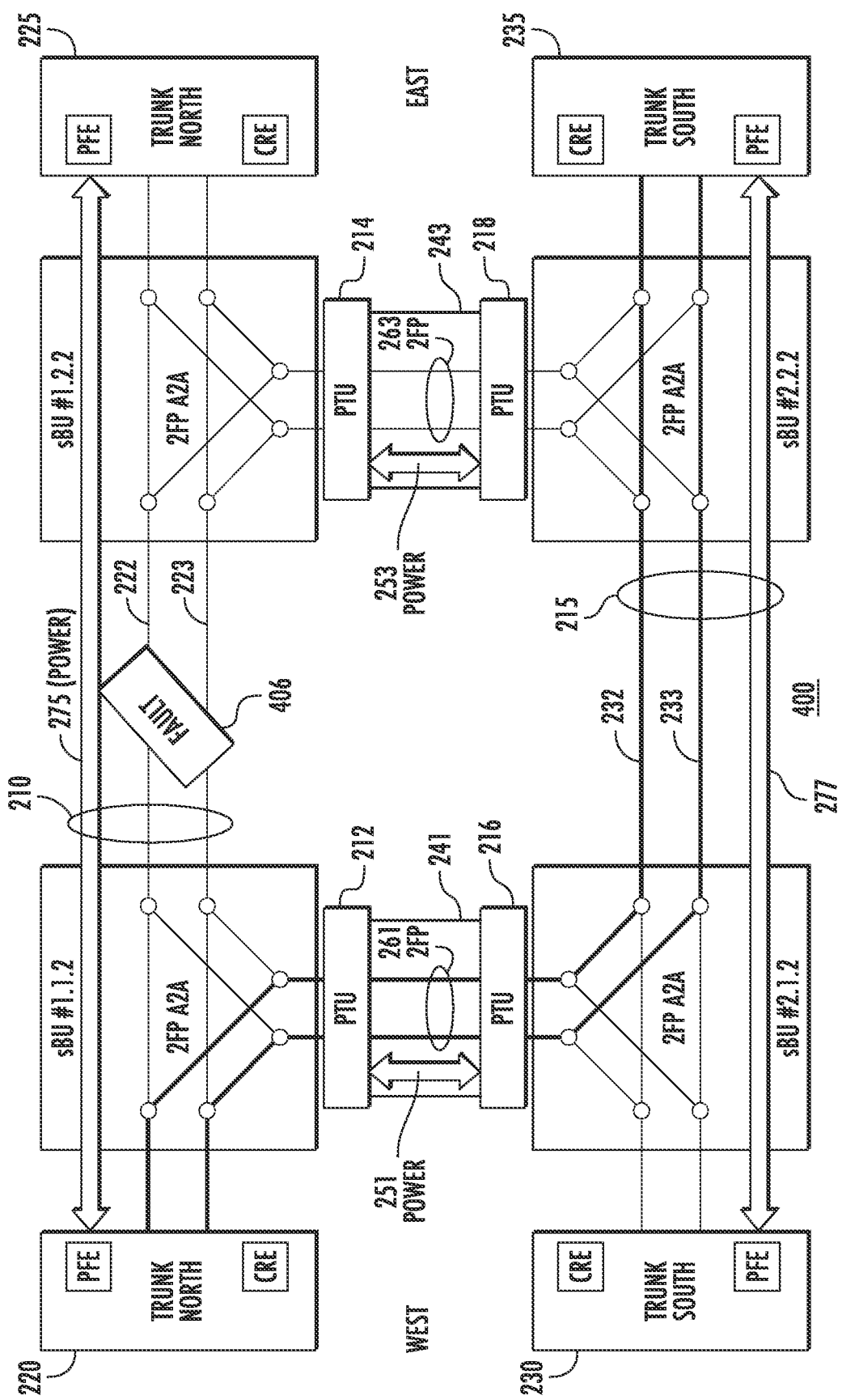
FIG. 4 illustrates a second example of a fault and a switching configuration.

FIG. 4 illustrates an example of shunt fault and switching configuration 400 according to one or more examples. For ease of explanation, the mesh network 200 of FIG. 2 and the components therein are used to describe the shunt fault and switching configuration 400 of FIG. 4. The configuration 400 may be implemented as a mesh network. In the illustrated example, a shunt fault 406 may occur "mid-ocean" or near the middle of the trunk-North fiber pairs 222 and 223.

Similar to FIG. 3, when the shunt fault occurs, for instance as shown in FIG. 4 between sBU #1.1.2 and sBU #1.2.2, at least power to the interconnects (e.g., interconnect cable 241 between sBUs #1.1.2, #2.1.2 and/or interconnect cable 243 between sBUs 204, #2.2.) between the North trunk fiber pairs 222 and 223 and South trunk fiber pairs 232 and 233 may be cut off. When the shunt fault is detected (or based on any determination that a fault may potentially occur) due to loss of electrical power or a decrease by a predetermined amount of voltage or current within the respective trunks 210 or 215, a respective sBU or sBUs in the optical path of the shunt fault or potential shunt fault may perform optical switching to at least re-route power. In examples, both of the trunk-North fiber pairs (222, 223) may be re-routed or switched on to the trunk-South pairs 232, 233 by reconfiguring the port connections of sBUs #1.1.2 and #2.1.2. Similarly, in a mirroring example, the port connections sBUs #1.2.2 and #2.2.2 can be also reconfigured to re-route or switch the trunk-North fiber pairs 222 and 223 to the trunk-South pairs 232 and 233 to provide and maintain power to the interconnections 243 between trunk-North cable 210 and trunk-South cable 215.

Figure 5:
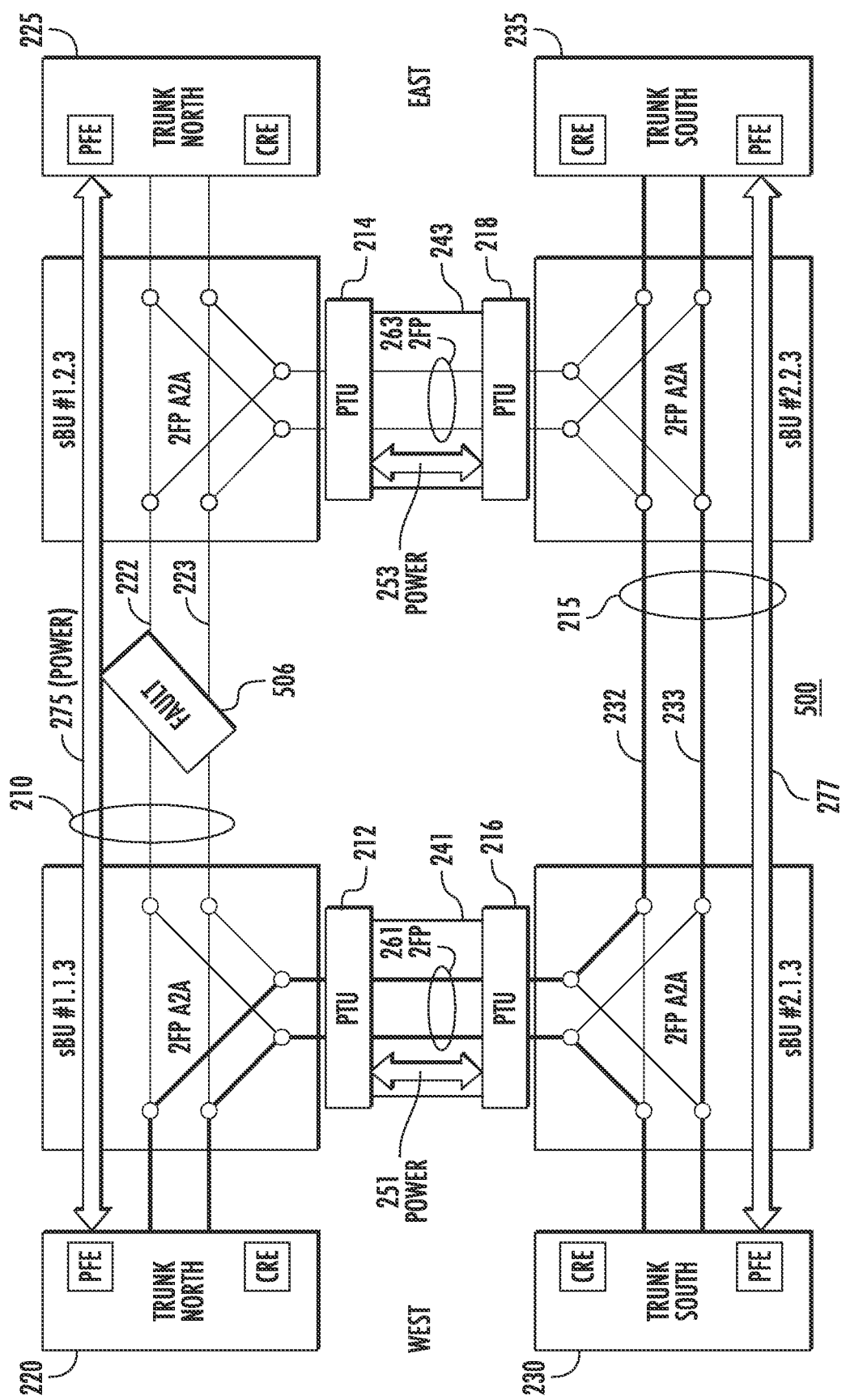
FIG. 5 illustrates a third example of a fault and a switching configuration.

FIG. 5 illustrates an example of shunt fault and switching configuration 500 of according to one or more examples. The configuration 500 may be implemented as a mesh network. For ease of explanation, the mesh network 200 of FIG. 2 and the components therein are also used to describe the shunt fault and switching configuration 500 of FIG. 4. In the illustrated example, a shunt fault 5060 may occur mid-ocean or near the middle of the trunk-North fiber pairs similar or identical to FIG. 4.

In an alternative example to FIG. 4, as shown in FIG. 5, only one trunk-North fiber pair 223 may be re-routed or switched in response to the detection of a shunt fault to trunk-South 230 while one fiber pair 232 of East trunk-South 235 stays in service with West, trunk-North 220 via sBUs #1.1.3 and #2.1.3. In at least that regard, there may be only one new fiber pair connection between trunk-North and trunk-South on the West side of the mesh network 500. Advantageously, the alternative configuration of FIG. 5 still enables power to be provided to at least the interconnections 241 and 243 between trunk-North and trunk-South despite the occurrence of the shunt fault. To at least that end, the 2FP A2A selection functionality of the sBU(s) provide the advantage of the aforementioned power switching and power routing architecture flexibility and configurations.

Figure 6:
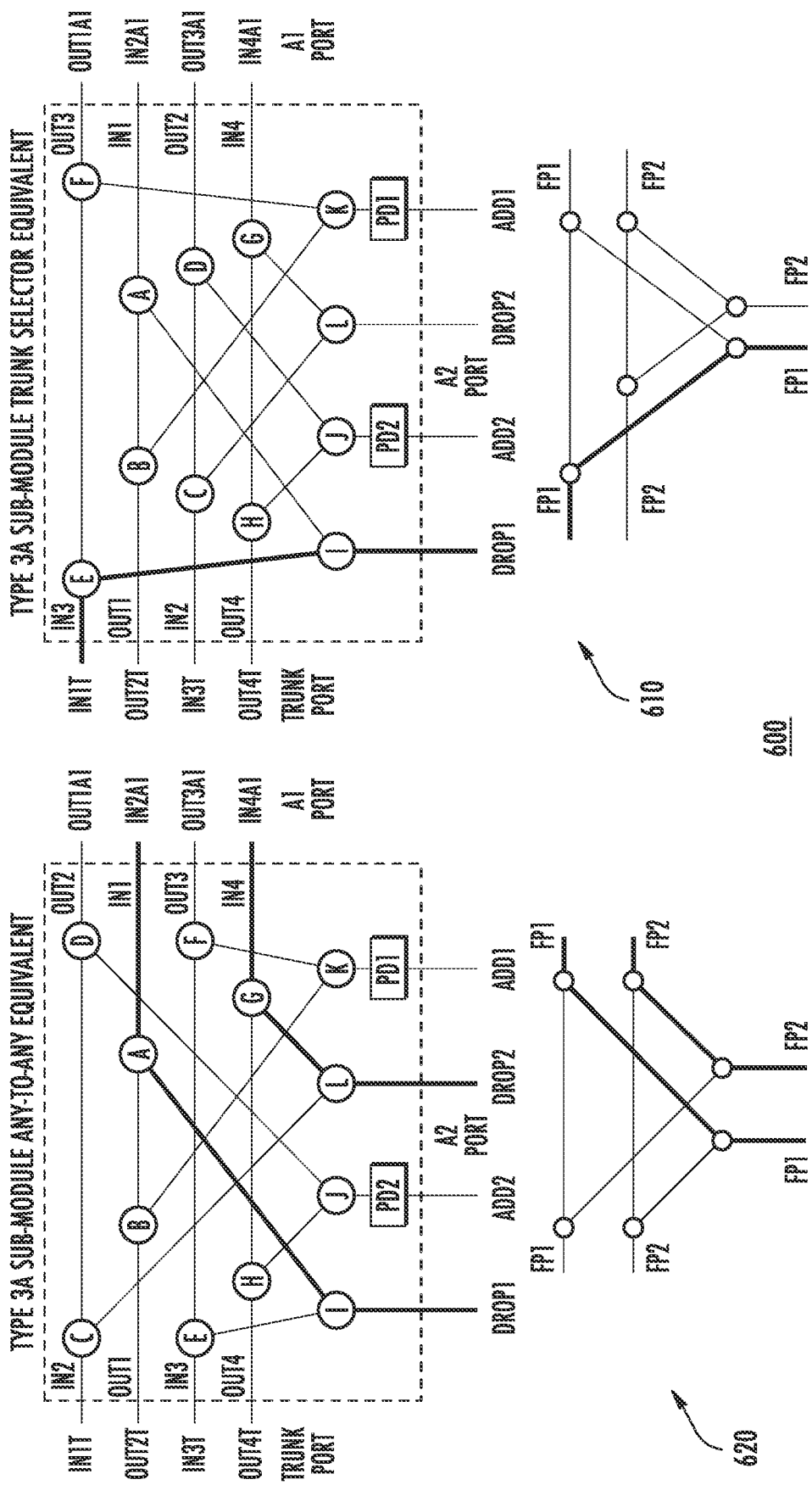
FIG. 6 illustrates an example comparison between a single fiber-pair-based trunk selector and a two fiber-pair-based any-to-any selector function.

FIG. 6 illustrates an example comparison 600 between a single fiber-pair-based trunk selector (implemented by sBU 610) versus a two fiber-pair-based any-to-any (A2A) selector (implemented by sBU 620) in the respective sBUs according to one or more of the disclosed examples. As shown in the configurations for both the single fiber-pair-based trunk selector of sBU 610 and two fiber-pair-based A2A selector of sBU 620, each respective sBU 610 or 620 may have at least three different ports: a trunk port, an "A1" port, and an "A2" port, with corresponding in and out connections and, further, add and drop connections for the branch fiber pairs. Each of respective sBU 610 and 620 are shown with optical switches (A-L for sBU 620 and 1-12 for sBU 610) that are operable to selectively switch a fiber pair coupled to a trunk port to the A2 port or from the A1 port to the A2 port.

In examples, for the "type 3A sub-module A2A equivalent" configuration of sBU 620, two fiber pairs are selected to drop to branch fiber pairs, as shown in the corresponding schematic. For instance, FP1 and FP2 may drop to branch FP1, and further, FP1 and FP2 may drop to branch FP2. This two fiber-pair-based A2A function may be implemented in the sBUs #1.1.3, #1.2.3, #2.1.3, and #2.2.3. of mesh network 200 of FIG. 2 described above. In alternative examples, a "type 3A sub-module trunk selector equivalent" or single fiber-pair-based trunk selector, such as 620, may be implemented in the sBUs #1.1.3, #1.2.3, #2.1.3, and #2.2.3.

According to examples, the single fiber-pair-based trunk selector may have different labels for a fiber path to form a two independent trunk fiber pair selector. In examples, a trunk fiber pair either on the East side or the West side may be selected to drop to a branch fiber pair on a per fiber pair basis, such as between optical switch E and optical switch I. For instance, one connection on one fiber pair may be available at a time. Moreover, it may be understood that one or more functions or features described in any of at least the FIGS. 2 to 5 above may be realized by a single fiber-pair-based trunk fiber pair selector. It may further be understood that a single fiber-pair trunk selector may be used on an odd fiber pair only case to provide the connection where all two fiber pairs can be connected with A2A switches in order to provide at least the extra connection with no additional costs.

Figure 7:
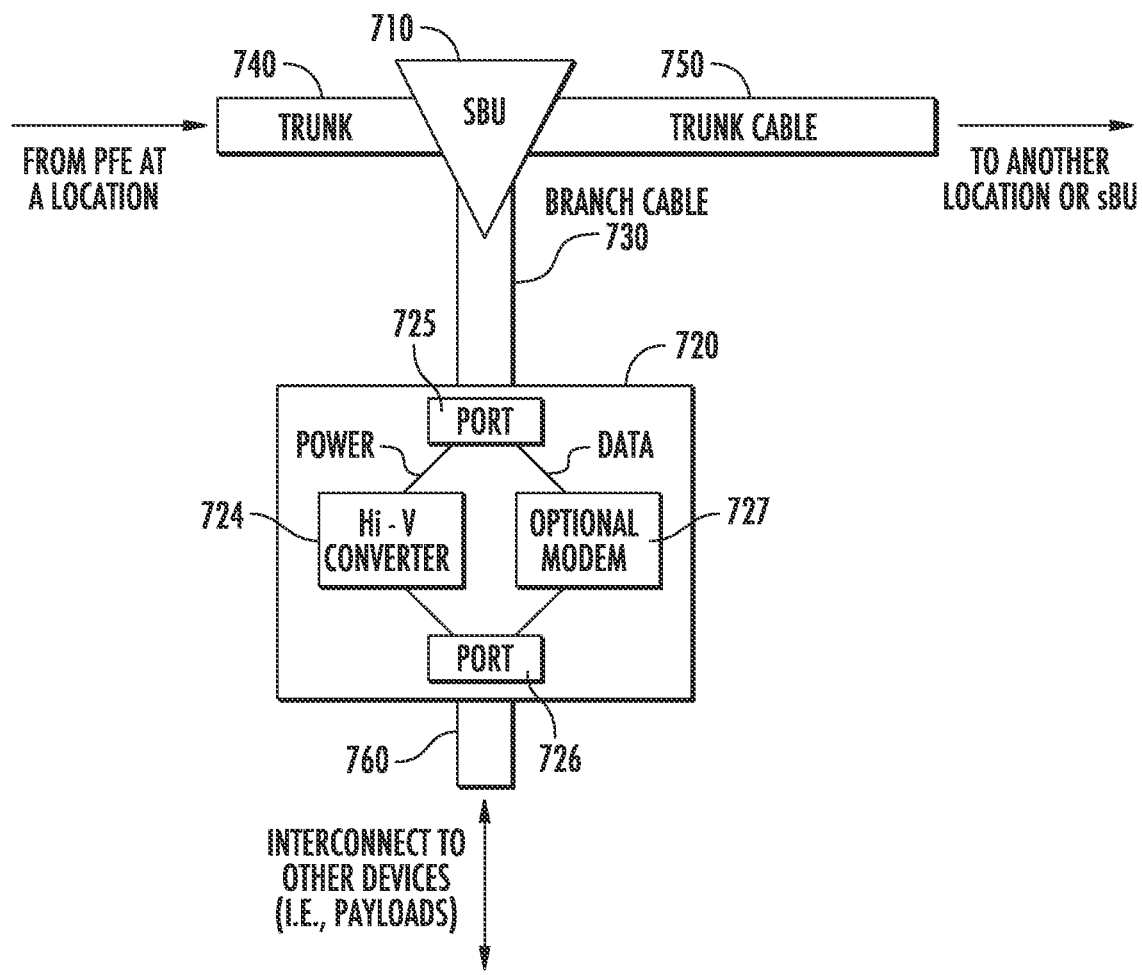
FIG. 7 illustrates an example configuration of an interconnection environment that includes an example of a switching branching unit and details of an example of a power termination unit.

FIG. 7 illustrates an example configuration of an interconnection environment that includes an example of a switching branching unit and details of an example of a power termination unit.

An undersea cable branching architecture 700 that includes an sBU 710 and a PTU 720 may be provided and configured to withstand the physical conditions present in a deep, undersea environment. The sBU 710 may be coupled to a trunk fiber optic cable 740 including optical fibers and electrical power conductors (such as those shown in the examples of FIGS. 2-5) from a location (not shown) that includes power feed equipment (PFE). The sBU 710 may be further coupled to a trunk cable 750 that includes fiber optic cables and electrical power conductors that may connect to another location and/or another sBU (both not shown). In the example, the branch cable 730 may couple the sBU 710 to the PTU 720. The PTU 720 is further coupled to an interconnect cable 760.

The sBU 710 provide optical switching and power switching functionality. For example, the sBU 710 may be configured with optical switches and control circuitry that enable the sBU 710 to be operable to determine connectivity between fiber pairs (not shown in this example) in the trunk fiber optic cable 740 and trunk cable 750 coupled to respective ports of the sBU 710 and an interconnect cable 760 coupled to the PTU 720. For example, sBU 710 may be operable to connect at least one of at least two fiber pairs (not shown in this example) of the trunk fiber optic cable 740 to a respective one fiber pair of the at least two fiber pairs (not shown in this example) of the branch cable 730.

The branch cable 730 may be a dual conductor cable (DCC) that is operable to provide electrical power between the sBU 710 and the PTU 720. The interconnect cable 740 may connect the PTU 720 to the various devices or payloads as shown in another example.

The PTU 720 may include a high voltage (labeled Hi-V in the figure) converter 724. The high voltage converter 724 enables the PTU 720 to provide controllable power from the trunk PFE to branch payloads. The high voltage converter 724 is operable to convert direct current voltages as high as 15 kV to other voltages, such as 12.5 kV and lower. The PTU 720 may have circuitry configured to implement known techniques for power conversion and control, but in an undersea environment. In addition, the high voltage converter 724 may be further operable to provide constant electrical current or constant voltage as well as limit the amount of current and limit the magnitude of the provided voltages. For example, the high voltage converter 724 may be operable to output an output current having a substantially constant value and is limited based on end user specifications. The PTU 720 also enables optical fibers to pass through for optical fiber coupling to other devices and/or trunks, such as those shown in the examples of FIGS. 2-5. The PTU 720 may be controlled via telemetry by command/response equipment (CRE) at a trunk location or another location, such as a remote point-of-presence, an off-shore facility, or the like. The CRE may include a processor, a memory storing programming code and telemetry circuitry that is operable to communicate with one or more PTUs, such as PTU 720.

As shown in FIG. 7, the PTU 720 may include a first coupling port 725, a high voltage converter 724, and a second coupling port 726. The PTU 720 may also include an optional modem for communication transmission. The first coupling port 725 may be configured to be coupled to an electrical power conductor and fiber optical cables of an undersea branch cable, such as 730. The In some examples, the undersea branch cable 730 may be a dual conductor cable that is connected to an undersea switched branching unit (such as 202 of FIG. 2), and the first coupling port 725 is operable to couple to a dual conductor cable. The high voltage converter 724 may be coupled to the first coupling port 725 and operable to connect to the electrical power conductor of the undersea branch cable 730 via the first coupling port 725. The high voltage converter 724 may be operable, for example, to convert a high voltage electrical power supplied by the electrical power conductor to an output voltage having a lower voltage electrical power than the high voltage electrical power. The high voltage converter 724 may be operable to output a voltage having a substantially constant value as the output voltage.

The second coupling port 726 may be configured to couple the high voltage converter 724 to an interconnect cable, such as 760. The high voltage converter 724, when coupled to the interconnect cable 760 may be operable to distribute the lower voltage electrical power to the interconnect cable 760.

Although not shown, the PTU 720 may include a processor, telemetry circuitry and a memory that may store programming code. The processor may be operable to execute the stored programming code to process communication signals received from PFE or CRE to manage the output of the high voltage converter 724. The high voltage converter 724 may be operable to receive, via the undersea branch cable 730, control signals from remotely located power feed equipment, for example, via trunk fiber optic cable 740. The control signals may include an indication of a shunt fault and include instructions for configuring the sBU, the PTU and their respective components. In addition, the high voltage converter 724 is further operable to adjust the output voltage in response to a command signal, for example, received from CRE, indicating a shunt fault.

The optional modem 727 may be configured to couple to the first coupling port and the second coupling port. The modem 727 may be operable to receive communication signals via the first coupling port 725 and process the communication signals. The processing of the communication signals may be according to known communication processing techniques and protocols. The modem 727 may be further operable to provide the processed communication signals to the second coupling port 726 for output to downstream devices, such as sensors or the like. The modem 727 may also be operable to receive other communication signals from the downstream devices and provide them to upstream devices or control devices, such as CRE.

The DCC enables the transmission of voltages from 12.5 kV to 15 kV to be converted or passed along to provide power to the other devices, such as repeaters, amplifiers, payload devices and systems, and the like, downstream (i.e., the other devices connected to the interconnect 760) from the PTU 720. For example, the high voltage converter 724 may be further operable to supply electrical power to power one or more payloads (e.g., a downstream device), which may be at least one of a repeater, an amplifier, an offshore facility, or a sensor.

The interconnect cable 740 coupled to the second port 726 of the PTU 720 may be either a DCC or a single conductor cable (SCC).

Optionally, the PTU 720 may include a modem 727 that enables data transmission for payload devices, which may include sensors, off-shore platforms and the like, coupled to the interconnect cable 740.

The interconnect environment 700 enables power switching in response to shunt faults to enable powering of devices on either side of the shunt fault or potential shunt fault. In addition, the interconnect environment 700 enables optical fiber switching as described with reference to the examples of FIGS. 2-5.

Figure 8:
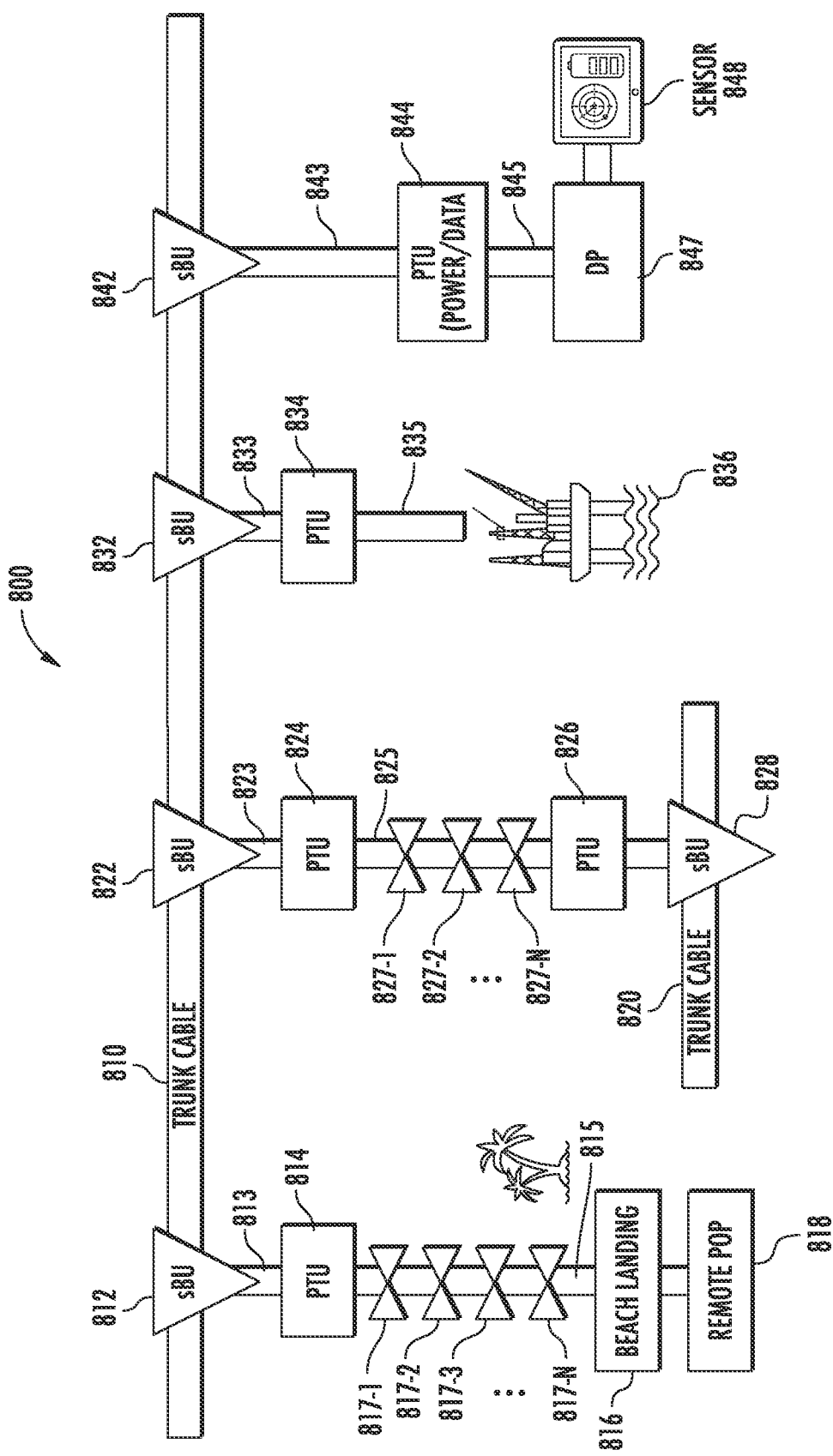
FIG. 8 illustrates example configurations for providing power to devices or systems downstream from an example of a power termination unit as disclosed herein.

FIG. 8 illustrates example configurations for providing power to devices or systems downstream from an example of a power termination unit as disclosed herein.

The configuration 800 includes multiple examples of interconnect environments that stem from sBUs 812, 822, 832 and 842. Each of the sBUs 812, 822, 832 and 842, in this example, are coupled to a trunk cable 810. The trunk cable 810 may be coupled to power feed equipment (PFE) that supplies electrical power to an electrical conductor(s) within the trunk cable 810. In addition, the trunk cable 810 includes fiber optic cables having a number of fiber pairs (FPs).

Each of the sBUs 812, 822, 832 and 842 illustrate an example implementation of a respective PTU 814, 824, 834 and 844.

One example implementation includes sBU 812 coupled to the PTU 814 via the cable 813. This implementation is operable to provide via sBU 812 and PTU 814 telecommunications to islands, expensive shoreline or unmanned facilities. The cable 813 may be a DCC. The PTU 814, which may be similarly configured and operable to perform functions like those described above of PTU 720 of FIG. 7, is also coupled to an interconnect cable 815. Also coupled to the interconnect cable 815 are various devices 817-1, 817-2, 817-3 . . . 817-N, which may also require power, such as repeaters, payload devices and the like. The cable 813 may provide both electrical power via electrical conductors and communications via optical fibers. The PTU 814 is operable to provide the electrical power and communications to the interconnect cable 815. The interconnect cable 815 including both electrical power via electrical conductors and communications via optical fibers may terminate at a beach landing 816. The example implementation including PTU 814 provides communication services via optical cables as well as electrical power to facilitate the provision of communication services to a remote point-of-presence (POP) 818.

In another example implementation, the sBU 822 is coupled to a PTU 824 via cable 823. Cable 823 may be a DCC. This implementation is operable to provide via sBU 822 and PTU 824 a cross-connection to trunk cables, like the examples of FIGS. 2-5. The PTU 824 may be similarly configured and operable to perform functions like those of PTU 720 of FIG. 7. The PTU 824 may be coupled to an interconnect cable 825. Also coupled to the interconnect cable 825 are various devices 827-1, 827-2, . . . 827-N, which may also require power, such as repeaters, payload devices and the like. The cable 823 may provide both electrical power via electrical conductors and communications via optical fibers. The PTU 824 is operable to provide the electrical power and communications to the interconnect cable 825. The interconnect cable 825 including both electrical power via electrical conductors and communications via optical fibers may terminate at another PTU 826. The PTU 826 may be configured similar to PTU 824 and provide electrical power conversion or may alternatively be coupled to ground. In yet another implementation, the PTU 826 may be optional and may not be present, similar to the beach landing implementation using sBU 812 and PTU 814. In an example, the interconnect cable 825 may terminate with the PTU 826. A branch cable (not labeled) may be coupled to the PTU 826 and couple with another sBU 828, which connects with trunk cable 820.

In yet another example implementation, the sBU 832 is coupled to a PTU 834 via cable 833. Cable 833 may be a DCC. This implementation is operable to provide via sBU 832 and PTU 834 telecommunications to off-shore facilities, such as off-shore platforms 836. The PTU 834 may be similarly configured and operable to perform functions like those of PTU 720 of FIG. 7. The PTU 834 may be coupled to an interconnect cable 835. The interconnect cable 835 may terminate at the off-shore platform 836. The PTU 834 may be operable to provide electrical power as described above, and data communications, for example, via an optional modem, such as 727 of the example PTU 720 of FIG. 7, to equipment on the off-shore platform 836.

In a further example implementation, the sBU 842 is coupled to a PTU 844 via cable 843. Cable 843 may be a DCC. This implementation is operable to provide via sBU 842 and PTU 844 communications and power to undersea sensor applications, such as sensor 848. The PTU 844 may be similarly configured and operable to perform functions like those of PTU 720 of FIG. 7 as well as data communications via the optional modem 727. The PTU 844 may be coupled to an interconnect cable 845 and the interconnect cable 845 may terminate at a deployment pallet (DP) 847. The DP 847 may be coupled to multiple sensors, such as sensor 848, which may be configured to detect temperature, salinity, seismic activity, obtain acoustic measurements or the like.

It may be understood that the above-described undersea mesh network of an optical communication system and related optical switching and electrical powering architecture can be arranged in various and different arrangements and not be limited to any particular arrangement or in any other manner.

Herein, novel and unique techniques for an improved optical switching and electrical powering architecture in undersea mesh networks are disclosed. The present disclosure is not to be limited in scope by the specific examples described herein. Indeed, other various examples of and modifications to the present disclosure, in addition to those described herein, will be apparent to those of ordinary skill in the art from the foregoing description and accompanying drawings.

Thus, such other examples and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An undersea power routing device assembly, comprising:
   a first undersea switching branching unit and a second undersea switching branching unit coupled to a first trunk undersea fiber optical cable;
   a third undersea switching branching unit and a fourth undersea switching branching unit coupled to a second trunk undersea fiber optical cable;
   a first power termination unit coupled between the first undersea switching branching unit and the third undersea switching branching unit by a first undersea branch cable;
   a second power termination unit coupled between the second undersea switching branching unit and the fourth undersea switching branching unit by a second undersea branch cable, each of the first and second the power termination units comprising:
      a first coupling port coupled to an electrical power conductor and fiber optical cables;
      a high voltage converter coupled to the first coupling port and operable to connect to the electrical power conductor via the first coupling port, wherein the high voltage converter is operable to convert a high voltage electrical power supplied by the electrical power conductor to an output voltage having a lower voltage electrical power than the high voltage electrical power; and
      a second coupling port configured to couple the high voltage converter to an interconnect cable, wherein the high voltage converter, when coupled to the interconnect cable is operable to distribute the lower voltage electrical power to the interconnect cable.

2. The undersea power routing device assembly of claim 1, each of the first and second the power termination units further comprising:
   a modem configured to couple to the first coupling port and the second coupling port, and operable to:

receive communication signals via the first coupling port,
process the communication signals, and
output to the processed communication signals via the second coupling port.

3. The undersea power routing device assembly of claim 1, wherein the second coupling port is operable to couple to the interconnect cable, wherein the interconnect cable is a dual conductor cable or a single conductor cable.

4. The undersea power routing device assembly of claim 3, wherein the high voltage converter is further operable to supply electrical power to power one or more payloads, wherein the one or more payloads include at least one of a repeater, an amplifier, an offshore facility, or a sensor.

5. The undersea power routing device assembly of claim 1, wherein the high voltage converter is further operable to:
adjust the output voltage in response to a command signal indicating a shunt fault.

6. The undersea power routing device assembly of claim 1, wherein the high voltage converter is further operable to:
receive, via the undersea branch cable, control signals from remotely located power feed equipment.

7. The undersea power routing device assembly of claim 1, wherein the high voltage converter is further operable to:
output, as the output voltage, a voltage having a substantially constant value.

8. The undersea power routing device assembly of claim 1, wherein the high voltage converter is further operable to:
output an output current having a substantially constant value and is limited based on end user specifications.

9. An undersea cable branching architecture, comprising:
a first switching branching unit and a second switching branching unit coupled to a first trunk undersea fiber optic cable;
a third undersea switching branching unit and a fourth undersea switching branching unit coupled to a second trunk undersea fiber optical cable;
a first branch cable coupled to the first switching branching unit and the third switching branching unit, the first branch cable including at least two fiber pairs and at least one electrical power conductor, wherein the first switching branching unit is operable to switch a high voltage electrical power supplied by the first trunk undersea fiber optic cable to the first branch cable;
a second branch cable coupled to the second switching branching unit and the fourth switching branching unit, the second branch cable including at least two fiber pairs and at least one electrical power conductor, wherein the second switching branching unit is operable to switch a high voltage electrical power supplied by the second trunk undersea fiber optic cable to the second branch cable; and
a first power termination unit coupled to the first branch cable, between the first switching branching unit and the third switching branching unit, the first power termination unit having a first port coupled to the at least one electrical power conductor of the first branch cable and a second port;
a second power termination unit coupled to the second branch cable, between the second switching branching unit and the fourth switching branching unit, the second power termination unit having a first port coupled to the at least one electrical power conductor of the second branch cable and a second port, wherein each of the first and second power termination units is operable to:
obtain the high voltage electrical power from the at least one electrical power conductor of the respective branch cable,
convert the high voltage electrical power from the respective switching branching unit to electrical power with a lower voltage than the high voltage electrical power, and
supply the electrical power with the lower voltage to the second port.

10. The undersea cable branching architecture of claim 9, wherein the first switching branching unit is further operable to connect at least one of at least two fiber pairs of the first trunk fiber optic cable to a respective one fiber pair of the at least two fiber pairs of the first branch cable.

11. The undersea cable branching architecture of claim 9, wherein the first power termination unit is operable, during converting of the high voltage electrical power from the first switching branching unit, to:
convert a low current of the high voltage electrical power to a higher current.

12. The undersea cable branching architecture of claim 9, wherein the first power termination unit is further operable to:
adjust a voltage output to compensate for a shunt fault that is in the first trunk undersea fiber optic cable.

13. The undersea cable branching architecture of claim 9, wherein the first power termination unit is further operable to:
receive, via the first branch cable, control signals from remotely located power feed equipment.

14. The undersea cable branching architecture of claim 9, wherein the first power termination unit is further operable to:
output a voltage having a substantially constant value as the output voltage.

15. The undersea cable branching architecture of claim 9, wherein the first power termination unit is further operable to:
output an output current having substantially a constant value and that is limited based on end user specifications.

16. The undersea cable branching architecture of claim 9, further comprising:
an interconnect cable connected to the second port of the first and second power termination units.

17. The undersea cable branching architecture of claim 16, further comprising:
one or more payload devices coupled to the interconnect cable, wherein the interconnect distributes the high current, low voltage electrical power from the second port, and at least one of the one or more payload devices is operable to use high current, low voltage electrical power.

18. The undersea cable branching architecture of claim 17, wherein the one or more payloads include repeaters, amplifiers, or sensors.

19. The undersea cable branching architecture of claim 9, wherein the first switching branching unit is operable to:
provide optical switching and power switching functionality, and
determine connectivity between fiber pairs in the first trunk undersea fiber optic cable and an interconnect cable coupled to the first power termination unit.

* * * * *